CHARLES F. THAYER.
Improvement in Loose Pulley Attachments.
No. 125,503.  Patented April 9, 1872.
Fig: I.
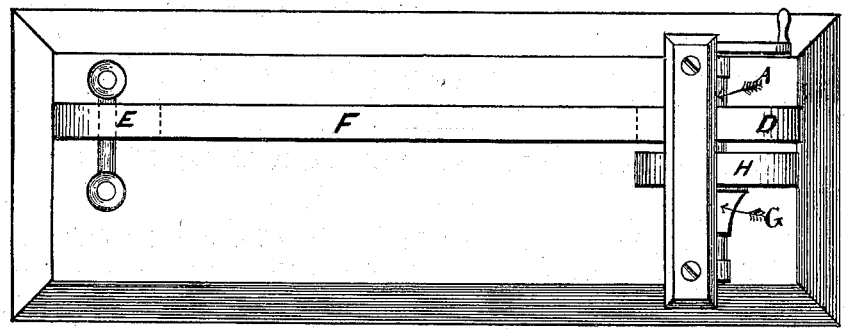
Fig: II.
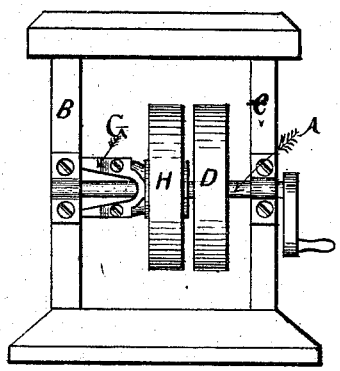
Fig: III.
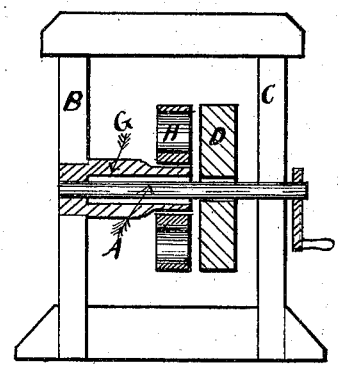
Fig: IV.
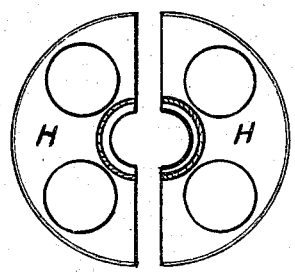

UNITED STATES PATENT OFFICE.

CHARLES FRANKLIN THAYER, OF LINESVILLE STATION, PENNSYLVANIA.

IMPROVEMENT IN LOOSE-PULLEY ATTACHMENTS.

Specification forming part of Letters Patent No. 125,503, dated April 9, 1872.

Specification describing certain Improvements in Loose-Pulley Attachments invented by CHARLES FRANKLIN THAYER, of Linesville Station, county of Crawford, State of Pennsylvania.

My invention consists in attaching to a given standard a sleeve, on which revolves a loose pulley a trifle smaller than the fixed pulley, not coming in contact with, but encircling or inclosing the line-shaft. By running the belt from the fixed pulley on the line-shaft to the loose pulley on the sleeve, the belts connecting the line-shaft with the machinery stops. Hereby accidents arising from the continuous motion of the belts over loose pulleys, and also the noise and dust created, as well as the wear and strain upon the belts and line-shaft are prevented, and also the power of running the belts saved.

In order to describe my invention more fully, I will refer to the accompanying drawing.

Figure I is a plan view of my invention. Fig. II is an end view of the same. Fig. III is a cut sectional view of the same. Fig. IV is a detached front view of a loose pulley.

A represents a line-shaft, which, as the case may be, runs along the whole length of the building, having connected thereon pulleys to give power or motion to the different parts of machinery by means of belts. B and C are two standards to support the line-shaft A. D represents a stationary pulley, securely fastened to the line-shaft and rotating with the same. This pulley E is to represent the ordinary pulley placed on the engine for conveying motion to the machinery. F is a belt to convey motion from the pulley E on the engine to the pulley D on the line-shaft. G is a hollow shaft or sleeve, securely fastened to the standard B. Through this hollow shaft G the line-shaft A freely rotates. Upon it, and near the stationary pulley D, is fastened a loose pulley, H, so as to rotate smoothly and freely. In order to allow the pulley H to be easily placed or replaced, or, if broken, to be replaced by another, I have divided it into two parts, as shown in Fig. IV. The two parts are firmly held together by bolts, screws, or other suitable devices.

When the machinery is in motion the belt F is in position, as shown in Fig. 1, connecting the pulleys D and E. But when the machinery is not wanted, or is desired to be put to a standstill, the belt F is shifted from the pulley D to the pulley H. It is obvious that, when this is done, the whole machinery is stopped, while the engine is permitted to make its revolutions. As the pulley H is not rotating upon the line-shaft, as was formerly the case, but upon the hollow shaft G, it is clear that three very essential points are gained: first, the preventing of the wear upon the line-shaft; secondly, the weight of the belt straining or pressing upon the line-shaft, which, being the case, when the loose pulleys worked altogether upon the line-shaft, greatly weakened and damaged the shaft; thirdly, the power necessary to drive these belts is saved.

Having thus fully described my invention, I desire to claim—

The sleeve G attached to the standard B, in combination with the loose pulley H, substantially as and for the purpose hereinbefore set forth.

CHARLES FRANKLIN THAYER.

Witnesses:
 MOSES BISHOP,
 ISAAC L. BISHOP.